United States Patent [19]

Ochiai

[11] Patent Number: 4,615,498
[45] Date of Patent: Oct. 7, 1986

[54] WHEEL AND TIRE FOR AIRCRAFT

[76] Inventor: Tsurunosuke Ochiai, 3169-6, Kumanohara-Machi, Karatsu City, Saga Pref., Japan

[21] Appl. No.: 678,572

[22] Filed: Dec. 4, 1984

[30] Foreign Application Priority Data

Dec. 15, 1983 [JP] Japan ................. 58-235097

[51] Int. Cl.$^4$ .......................................... B64C 25/40
[52] U.S. Cl. ................................................ 244/103 S
[58] Field of Search ............... 244/183 S; 416/197 R, 416/197 B

[56] References Cited

U.S. PATENT DOCUMENTS

| 2,057,979 | 10/1936 | Ring ................................. | 416/197 B |
| 3,178,135 | 4/1965 | Moore ............................. | 244/103 S |
| 3,233,849 | 2/1966 | Rubin ............................. | 244/103 S |

FOREIGN PATENT DOCUMENTS

| 931279 | 7/1955 | Fed. Rep. of Germany ... | 416/197 B |
| 2080217 | 2/1982 | United Kingdom ............ | 244/103 S |

Primary Examiner—Galen Barefoot
Attorney, Agent, or Firm—Young & Thompson

[57] ABSTRACT

A wheel and tire for an aircraft includes a number of wind receiving ledges radially arranged on side surfaces of the tire for causing the tire to rotate by receiving wind pressure before touch-down of the aircraft in a landing position. According to the invention each ledge is formed on its edge with a bead to obtain rotating speed of the wheel and tire proportional to wind velocity, thereby making it possible to design the wheel and tire whose circumferential velocity at the moment of touch-down is as coincident or substantially coincident with the touch-down speed of the aircraft as possible. Each wind receiving ledge consists of a wind receiving tire ledge formed integral with a tire and a wind receiving wheel ledge integrally or detachably fixed to a wheel centrally provided on the tire, thereby enabling the wind receiving wheel ledge to be changed by exchanging the wheel or the wind receiving wheel ledge itself for other wheel or wheel ledge having a different wind receiving area so as to vary the center of wind pressure acting on the wind receiving ledge.

3 Claims, 5 Drawing Figures

WHEEL AND TIRE FOR AIRCRAFT

BACKGROUND OF THE INVENTION

1. Field of the Invention

This invention relates to a wheel and tire for an aircraft, and more particularly an improved wheel and tire for an aircraft adapted to be rotated without any driving power before touch-down to reduce friction between a tire and a runway upon touch-down, thereby elongating its life.

2. Description of the Prior Art

The term "wheel and tire" used herein is intended to designate a rotating member in its entirety including a tire and a wheel made of metal centrally located in the tire.

It has been generally said that the life of tires for air-craft, particularly high speed machines is so short that they cannot be used for landing more than several times or at the most twenty times. It is much shorter than that of tires for automobiles. Such a short life results from the friction between the tire and the ground or runway due to the fact that induced rotation of the wheel and tire at touching-down cannot completely match the touch-down speed of the aircraft. It has been therefore proposed to previously rotate tires of an aircraft by wind force or driving power before the touch-down of the aircraft in order to prolong the life of the tires. However, such a proposal has not been practically used because there are various problems in the aerodynamics, flight technique determining the touch-down speed and other factors which are complicated in conjunction with each other and difficult to solve.

In case of a wheel and tire adapted to previously rotate by the wind force before the touch-down, the circumferential velocity of the tire is determined by the "product" of the ratio of induced velocity of wind receiving ledges formed on the tire to the wind velocity (referred to hereinafter "induced rotation rate") and the ratio of the distance between centers of the wind pressure at the wind receiving ledges and the center of the wheel and tire (referred to hereinafter "arm ratio"). However, as the induced rotation rate for determining the circumferential velocity of the wheel and tire varies with factors such as turbulence of the air flow and degree of the turbulent flow and further factors not proportional to air flow velocity, it is very difficult to design a wheel and tire capable of adapting its circumferential velocity to the touch-down speed of an aircraft.

SUMMARY OF THE INVENTION

It is a principal object of the invention to provide an improved wheel and tire for an aircraft, which solves the problem in the prior art and eliminates all the disadvantages in the prior art above described and which comprises wind receiving ledges capable of inducing rotation of the wheel and tire upon landing of the aircraft and proportional to wind velocity, thereby making the circumferential velocity of the wheel and tire coincident with the touch-down speed of the aircraft so as to reduce the friction between the wheel and tire and the runways to prolong the service life of the wheel and tire.

In order to achieve this object, the wheel and tire for an aircraft according to the invention comprises a number of wind receiving ledges causing said wheel and tire to rotate by receiving thereon wind pressure and radially arranged on side surfaces of the wheel and tire except its tread surface contacting the runway, each ledge being formed on its edge with a bead.

With such an arrangement having beads at the wind receiving ledges, the wheel and tire according to the invention exhibits the same function as that of a 3-cup anemometer wherein the speed of rotation of the cups is proportional to wind velocity without being adversely affected by turbulence of air flow and variation in degree of the turbulent flow with the aid of turbulent boundary layers on the cups. Although the wind receiving ledges are different in shape from the cups of the 3-cup anemometer, the beads on the wind receiving ledges always make boundary layers of air flow on outer surfaces of the ledges to be turbulent boundary layers so as to avoid the variation in induced rotation rate of the wheel and tire and to obtain a rotating speed of the wheel and tire proportional to wind velocity.

In a preferred embodiment of the invention, each wind receiving ledge consists of a wind receiving tire ledge formed integrally with the tire and a wind receiving wheel ledge provided on a wheel centrally provided on the tire, the wind receiving tire and wheel ledges forming one of the wind receiving ledges, thereby enabling the wind receiving wheel ledge to be changed by exchanging the wheel for a wheel having a different wind receiving area, so as to vary the center of wind pressure acting on the wind receiving ledge. In this manner, the "product" of the induced rotation rate and the arm ratio above described can be corrected according to any actual requirements.

In a modification of the above embodiment, the wind receiving wheel ledge is detachably fixed to the wheel by fastening means, such as set screws, hexagonal headed bolts, screw-threaded studs and nuts or the like, thereby enabling the wind receiving wheel ledge to be changed so as to vary the center of wind pressure acting on the wind receiving ledge.

In order that the invention may be more clearly understood, preferred embodiments will be described, by way of example, with reference to the accompanying drawings.

DETAILED DESCRIPTION OF THE PREFERRED EMBODIMENT

Figure 1:
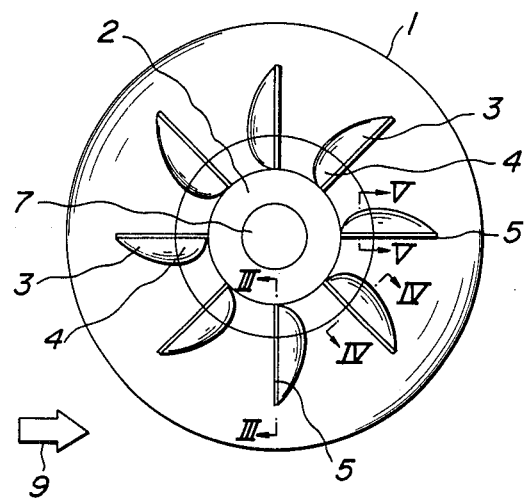
FIG. 1 is a plan view of a wheel and tire of one embodiment of the invention.
Figure 2:
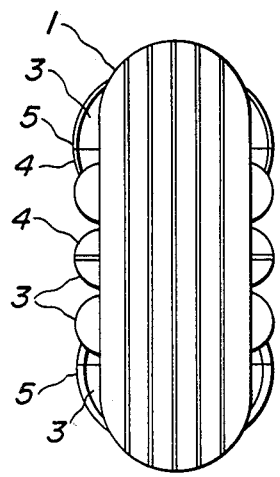
FIG. 2 is a side view of the wheel and tire shown in FIG. 1.

Referring to FIGS. 1 and 2 illustrating a preferred embodiment of a wheel and tire for an aircraft according to the invention, the tire 1 comprises, on at least one side surface, wind receiving ledges 4 arranged substantially equally spaced in a circle and extending radially such that their radially outermost ends are at locations approximately 80% of the radii of the wheel and tire from the center of an axle 7 and their radially innermost ends are at locations approximately 20–40% of the radii of the wheel and tire from the center of the axle 7.

According to the invention, each the wind receiving ledge is formed on its edge with a bead 5. In the embodiment shown in FIGS. 4 or 5, the bead has a circular cross-section with its semi-circular portion extending away from the side surface of the wheel and tire.

Figure 3:
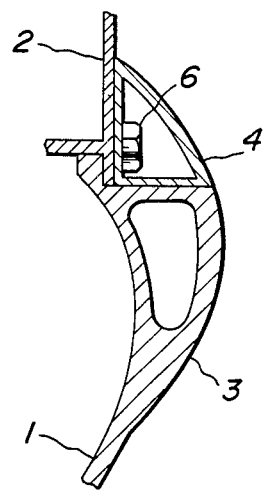
FIG. 3 is a partial sectional view taken along the line III—III in FIG. 1 illustrating a further modification of the invention.
Figure 4:
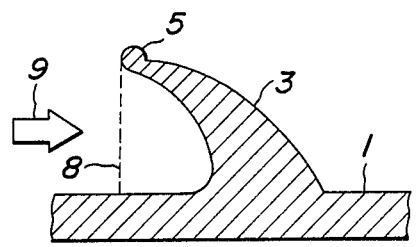
FIG. 4 is a partial sectional view taken along the line IV—IV in FIG. 1.
Figure 5:
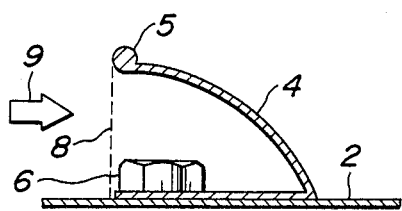
FIG. 5 is a partial sectional view taken along the line V—V in FIG. 1.

In this preferred embodiment of the invention, each wind receiving ledge consists of a wind receiving tire ledge 3 formed on the tire 1 and a wind receiving wheel ledge 4 formed on the wheel 2 in close contact with each other at a boundary between the tire 1 and the wheel 2 as shown in FIG. 3. The wind receiving tire and wheel ledges 3 and 4 forming each wind receiving ledge are formed on their edges with a continuous bead 5 as shown in FIGS. 4 and 5 illustrating respective cross-sections of the ledges 3 and 4. An outer surface of the wind receiving ledge extending on both the tire 1 and wheel 2 is in the form of a part of an ellipsoid extending in the rotating direction of the wheel and tire so as to minimize air resistance on the ledge.

The wind receiving tire ledges 3 are made of the same material as that of the tire 1 and may be integrally molded with the tire or attached thereto by an adhesive. The wind receiving wheel ledges 4 are made of a light alloy such as duralumin or any other lightweight and wind pressure-resistant material. In this case the wind receiving wheel ledges 4 may be integrally formed with the wheel 2 or may be formed separately from the wheel 2. The separately formed wind receiving wheel ledges 4 may be fixed to the wheel 2 by fastening means 6 such as set screws, hexagonal headed bolts, screw-threaded studs and nuts or the like. In this manner, the wind receiving wheel ledges 4 can be changed by exchanging separate wheels 4 or wind receiving wheel ledges themselves having different areas for receiving the wind so as to vary the center of wind pressure acting on each wind receiving ledge to correct the "product" of the induced rotation rate and the arm ratio above described according to actual requirements.

The wind receiving ledges are so arranged that an opening 8 of one wind receiving ledge nearest to the ground is directed to an advancing direction of an aircraft. Arrows 9 in the drawings indicate directions of wind.

It is required to assume a touch-down speed and conditions for obtaining the maximum induced rotation of a wheel and tire in addition to aerodynamic factors in order to adapt the circumferential velocity of the wheel and tire to the touch-down speed. In general, it is the most preferable for an aircraft that the main landing gears are extended downward when the aircraft is at a speed approximately 200% of its stalling speed, and the speed and altitude of the aircraft are progressively reduced so as to bring it into an approach condition for landing at an elevation 15 m above one end of a runway at the speed about 130-150% of the stalling speed to carry out a touch-down at a speed 110-120% of the stalling speed. The time from the lowering of the landing gear to the touch-down is long enough to cause the induced rotation of the wheel and tires by wind pressure, so that the rotating speed of the wheel and tires probably arrives at the maximum at the moment when the aircraft is at a speed of the order of approximately 170% of the stalling speed. It is considered that the maximum rotating speed of the wheel and tires is maintained until the touch-down owing to their inertia and the wind pressure which replenishes the rotating energy.

On the other hand, as the wind receiving ledges according to the invention are identical in function with a 3-cup anemometer whose ratio of its rotating speed to the wind velocity is of the order of 33.9%, the induced rotation rate of the wheel and tire according to the invention will be of the order of 34%. If the center of wind pressure on the wind receiving ledge is for example at a location 53% of the radius of the wheel and tire from the center of the axle, its circumferential velocity of the wheel and tire is 64.15% ($34 \times (1/0.53) = 64.15$) of the wind velocity because the circumferential velocity of the wheel and tire is obtained by the "product" of the induced rotation rate and the arm ratio as above described. Assuming that the maximum induced rotating speed of the wheel and tire is caused at a speed approximately 170% of the stalling speed of an aircraft, the maximum circumferential velocity of the wheel and tire is about 109% ($64.15 \times 1.7 = 109$) of the stalling speed of the aircraft. As above mentioned, the touch-down speed is of the order of 110-120% of the stalling speed, and the maximum circumferential speed of the wheel and tire is about 94.78% ($109 \div 1.15 = 94.78$) of the touch-down speed which is now a mean value 115% of the stalling speed.

Usually, wind blows more or less. In the event that an aircraft whose stalling speed is approximately 185.2 km/h (51.44 m/sec) is landing when the wind having a velocity of 3 m/sec is against it, the maximum circumferential velocity of the wheel and tire is about 100%

$$\left( 94.78 \div \frac{51.44 - 3}{51.44} = 100.6 \right)$$

of the touch-down speed. In other words, the maximum circumferential velocity is coincident with the touch-down speed.

Although the above explanation has been effected with average values for flight control conditions and characteristics of wheel and tires, the effect will vary with the set or assumed conditions. The significant effects can be achieved by selecting and using the wind receiving ledges having optimum centers of wind pressure according to the invention.

As can be seen from the above explanation, the invention provides an improved wheel and tire for an aircraft, which is provided with wind receiving ledges capable of inducing rotation of the wheel and tire to meet landing of the aircraft and proportional to wind velocity without being adversely affected by turbulence of air flow, thereby prolonging the life of the wheel and tire by the wind receiving ledges rendering the circumferential velocity of the wheel and tire coincident with the touch-down speed of the aircraft to reduce the friction between the wheel and tire and runways.

It is further understood by those skilled in the art that the foregoing description is that of preferred embodiments of the disclosed tires for air-craft and that various changes and modifications may be made in the invention without departing from the spirit and scope thereof.

What is claimed is:

1. A wheel and tire for an aircraft, said wheel and tire comprising a number of wind receiving ledges causing said wheel and tire to rotate by receiving thereon wind pressure and radially arranged on side surfaces of the wheel and tire except its tread surface contacting a runway, each ledge being formed on its edge with a bead, each said wind receiving ledge comprising a wind receiving tire ledge formed integrally with the tire and a wind receiving wheel ledge provided on the wheel, and means detachably securing the latter wheel ledge on the wheel.

2. A wheel and tire as set forth in claim 1, wherein said wind receiving ledges are arranged substantially equally spaced in a circle and extending radially such that their radially outermost ends are at a location approximately 80% of the radii of the wheel and tire from the center of the wheel and the radially innermost ends are at locations approximately 20–40% of the radii of the wheel and tire from the center of the wheel.

3. A wheel and tire as set forth in claim 1, wherein each said bead has a circular cross-section with a semi-circular portion extending away from said side surface of the wheel and tire.

* * * * *